US011988992B2

(12) United States Patent
Wang et al.

(10) Patent No.: US 11,988,992 B2
(45) Date of Patent: May 21, 2024

(54) ELECTRICAL PULSE GENERATOR HARVESTING BODY MOVEMENT ENERGY

(71) Applicant: Wisconsin Alumni Research Foundation, Madison, WI (US)

(72) Inventors: Xudong Wang, Middleton, WI (US); Jun Li, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 1258 days.

(21) Appl. No.: 16/600,046

(22) Filed: Oct. 11, 2019

(65) Prior Publication Data

US 2021/0109480 A1 Apr. 15, 2021

(51) Int. Cl.

*G04B 1/02* (2006.01)
*G04C 1/08* (2006.01)
*G04C 10/00* (2006.01)

(52) U.S. Cl.

CPC ............... *G04B 1/02* (2013.01); *G04C 1/082* (2013.01); *G04C 10/00* (2013.01)

(58) Field of Classification Search

CPC ........... G04B 1/02; G04C 1/082; G04C 10/00
See application file for complete search history.

(56) References Cited

U.S. PATENT DOCUMENTS

| | | | | |
|---|---|---|---|---|
| 7,306,364 | B2 * | 12/2007 | Born | G04C 11/084 368/204 |
| 2004/0192423 | A1 * | 9/2004 | Nevermann | G04G 21/00 455/567 |
| 2007/0019272 | A1 | 1/2007 | Hillis et al. | |
| 2017/0209695 | A1 * | 7/2017 | Solomon | A61N 7/02 |
| 2019/0079453 | A1 * | 3/2019 | Haemmerli | G04B 17/066 |

OTHER PUBLICATIONS

Excerpt from Wikipedia article "Preferred walking speed", captured by Internet Archive Dec. 16, 2017 (Year: 2017).*

* cited by examiner

*Primary Examiner* — Edwin A. Leon
*Assistant Examiner* — Sean R Brannon
(74) *Attorney, Agent, or Firm* — Boyle Fredrickson, S.C.

(57) ABSTRACT

An energy harvesting system for use with the human body may use an eccentrically mounted weight winding a mainspring that drives a mechanical clock mechanism. The mechanical clock mechanism in turn may produce pulses of electricity, for example, through periodic flexing of a piezoelectric or triboelectric material during the regular motion of the mechanical timing mechanism. By remaining in a mechanical rather than electrical domain, improved simplicity and efficiency may be obtained in the generation of regularly spaced uniform pulses.

17 Claims, 3 Drawing Sheets

ELECTRICAL PULSE GENERATOR HARVESTING BODY MOVEMENT ENERGY

STATEMENT REGARDING FEDERALLY SPONSORED RESEARCH OR DEVELOPMENT

--

CROSS REFERENCE TO RELATED APPLICATION

--

BACKGROUND OF THE INVENTION

The present invention relates generally to energy harvesting systems and in particular to an energy harvesting system well adapted to extract energy from the motion of living beings to generate therapeutic electrical pulses.

Energy harvesting systems extract energy from the environment, for example, from environmental electromagnetic waves, changes in atmospheric pressure, or mechanical motion. This latter source of environmental energy is of particular interest for electronic devices that may be attached to machines, for example, to scavenge energy from machine vibration for wireless communication.

Such methods for electrical energy harvesting may make use of mechanical resonators tuned to sympathetically vibrate at a frequency of vibration of the machine or the like. Electrical generators such as magnets and coils or piezoelectric materials can then convert this sympathetic vibration to electrical energy. Such resonant mechanical energy harvesters are not well adapted to convert low-frequency body motions of a typical individual. The use of a mechanism of a self-winding wristwatch has been generally proposed as an energy harvesting device for wearable items (see, for example, US patent application 2007/0019272 related to autofocusing glasses); however, converting this mechanical motion to meaningful electrical power and the necessary circuitry would appear to present significant obstacles to practical use.

SUMMARY OF THE INVENTION

The present invention provides an energy harvester suitable for harvesting energy from normal body movements using an eccentric weight similar to those used in a self-winding watch. The system provides electrical generation while sidestepping the conversion losses associated with conventional circuitry such as rectifiers and electrical batteries by employing a mechanical oscillator that directly produces a set of pulses directly usable for therapeutic purposes. In one embodiment the well-established and efficient mechanical watch escapement mechanism is used to provide mechanical impulse forces directly convertible by piezoelectric or triboelectric elements.

In one embodiment, the invention provides a mechanical energy harvesting pulse generator having a housing adapted for support against a movable portion of a user's body and a weight movably attached to the housing to move with respect to the housing with motion by the portion of the user's body. A winder mechanism communicates between the weight and energy storage spring to wind the energy storage spring with movement of the weight with respect to the housing, and a mechanical oscillator communicates with the energy storage spring to provide reciprocating motion using energy of the mainspring. An electrical generator moved by the mechanical oscillator generates a regular train of electrical pulses.

It is thus a feature of at least one embodiment of the invention to provide efficient generation of therapeutically operative electrical pulses through the use of a mechanical energy harvester directly communicating with a mechanical oscillator avoiding circuitry and conversion inefficiencies.

The electrical generator is at least one of a piezoelectric material and triboelectric material flexed by movement of the mechanical oscillator.

It is thus a feature of at least one embodiment of the invention to provide a simple electrical generator that can be easily integrated into a mechanical oscillator.

The mechanical oscillator may provide an impulse force to the electrical generator by a mechanical striking impact.

It is thus a feature of at least one embodiment of the invention to provide a desired electrical voltage for therapeutic use through a mechanical "step up" produced by an impulse force avoiding electrical conversion losses associated with electrical step up mechanisms such as transformers and the like.

The mechanical oscillator may be a balance wheel and escapement, and the energy generator may provide at least one pallet of the escapement to flex with operation of the escapement.

It is thus a feature of at least one embodiment of the invention to leverage the highly developed clock escapement mechanism for the use of therapeutic electrical pulses.

The electrical generator may produce at least one pulse with each cycle of rotation of the balance wheel.

It is thus a feature of at least one embodiment of the invention to use the balance mechanism to provide a desired therapeutic spacing of electrical pulses.

The energy generator may in some embodiments provide two pallets of the escapement to flex with operation of the escapement, and wherein the electrical energy generator produces two pulses with each cycle of rotation of the balance wheel.

It is thus a feature of at least one embodiment of the invention to flexibly provide a desired frequency of pulse repetition with relatively lower mechanical oscillator frequency.

The mechanical energy harvester may further include electrodes adapted for applying the train of pulses to the skin of the individual at the portion of the user's body.

It is thus a feature of at least one embodiment of the invention to provide an apparatus for therapeutic electrical stimulation of the skin eliminating batteries and their associated shelf life weight and toxicity.

The mechanical energy harvester may include flexible attachment retainers for attaching the housing to the portion of the body with the electrodes adjacent to skin. In one embodiment the flexible attachment retainers may include an adhesive for attaching the housing to a portion of the body through skin adhesion and the housing.

It is thus a feature of at least one embodiment of the invention to provide an energy harvesting system that can be local to a therapeutic site and attached directly to the skin at that site.

The housing may be releasably removable from the flexible attachment retainers.

It is thus a feature of at least one embodiment of the invention to provide a cost-efficient combination of the energy harvesting system with disposable and separately sterilizable skin attachment electrodes.

The weight may be mounted to be stable at multiple angular positions about the pivot absent inertial force on the weight.

It is thus a feature of at least one embodiment of the invention to provide a system that has improved response to random frequency movements in contrast to a mechanically resonant system which will have a narrower band of harvestable energy motions.

The weight may have a maximum response to movement at frequencies less than 10 Hz.

It is thus a feature of at least one embodiment of the invention to provide a system that can harvest extremely low frequency motion matching normal body movement.

The electrical pulses may have a voltage of at least 0.1 V.

It is thus a feature of at least one embodiment of the invention to directly output therapeutically significant electrical voltages that can overcome normal skin resistance and the like.

The weight of the mechanical energy harvester may be mounted on a pivot to rotate about an axis of the pivot with body motion.

It is thus a feature of at least one embodiment of the invention to provide a compact weight system that allows extensive travel to be sensitive to low frequencies.

The energy storage spring may be a helical coil spring windable about a spring axis parallel to the axis of the pivot of the weight.

It is thus a feature of at least one embodiment of the invention to provide an energy storage system that minimizes mechanical gear trains and the like between the energy storage system and the weight by permitting, for example, coaxial or parallel axis rotations.

These particular objects and advantages may apply to only some embodiments falling within the claims and thus do not define the scope of the invention.

DETAILED DESCRIPTION OF THE PREFERRED EMBODIMENT

Figure 1:
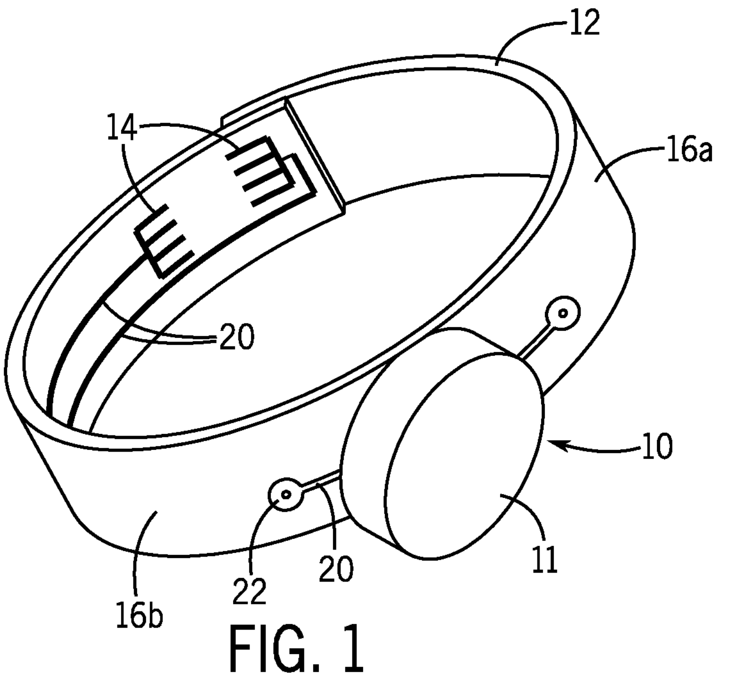
FIG. 1 is a perspective view of one embodiment of the mechanical harvester of the present invention attached to a reusable strap attaching the harvester to the body and providing electrodes for wound healing.

Referring now to FIG. 1, a body movement energy harvester 10 per one embodiment of the invention may provide a housing 11 connectable to a person's body by means of a flexible band 12. The flexible band 12 may support electrodes 14 on its inner surface such as may be located at the site of a wound or at other areas of the skin where therapeutic effect may be desired.

For the purpose of adjustment, the band 12 may have a first strap **16*a* extending rightward (as depicted) from a housing 11 of the body movement energy harvester 10 and a second strap 16*b* extending leftward (as depicted) from the housing 18. The distal ends of the straps 16*a* and 16*b* may be connectable by means of a clasp or other fastening mechanism (such as Velcro) to provide an adjustable length, encircling band that may pull the electrodes 14 against the site. The band 12 may provide for electrical communication by means of conductors 20 and electrical vias 22 between the housing 11 of the body movement energy harvester 10 and the electrodes 14**.

Figure 2:
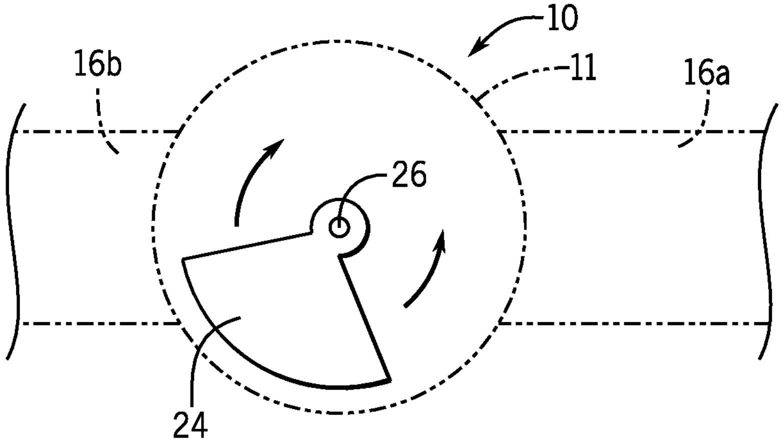
FIG. 2 is a phantom view of the housing of the harvester of FIG. 1 showing an inertial weight mounted for rotation in response to movement of the body.

Referring now also to FIG. 2, the housing 11 may contain an eccentric inertial weight 24 pivoting about a central axle 26 with motion of the housing 11 so that when the strap 16 holds the body movement energy harvester 10 on the patient, motion of the patient may cause movement of the weight 24. As will be generally understood to those of ordinary skill in the art, motion of the inertial weight 24 causes it to move in a plane orbiting the central axle 26 caused by motion of the body acting on a center of mass of the inertial weight 24 offset perpendicularly to the axis of rotation of the central axle 26. Generally, the inertial weight 24 is free from restoring springs that would center it at a particular location and such as might create tuned mechanical resonance dominating its ability to move at different frequencies of inertial excitation.

Figure 3:
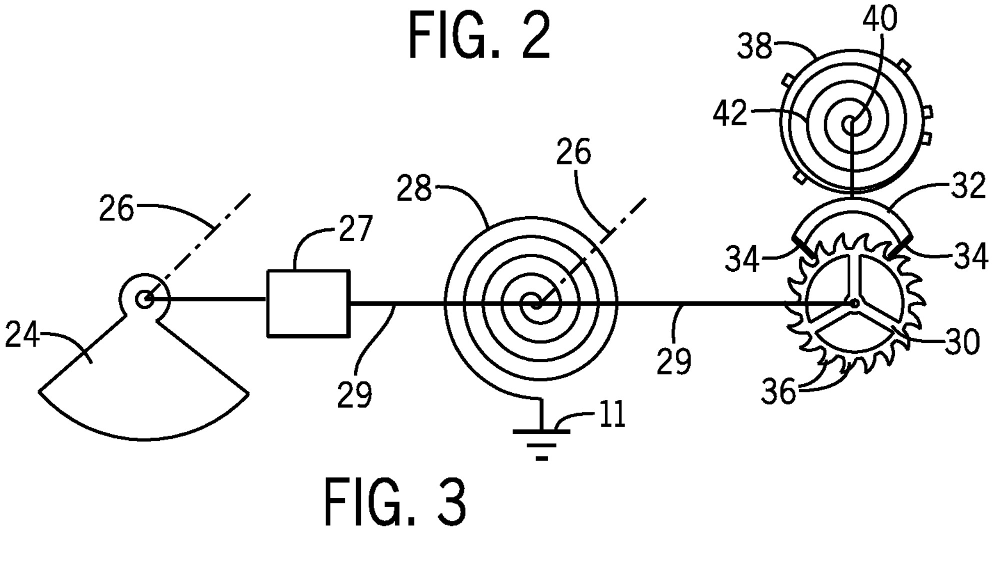
FIG. 3 is a block diagram of an automatic watch mechanism of a type suitable for use with the present invention attaching the inertial weight of FIG. 2 through a re-winder to a mainspring, the latter driving an escapement and balance wheel, the former modified to provide electrical generation.

Referring now to FIG. 3, the weight 24 may be connected through a reverser and gear train 27 which serve to convert rotary motion of the weight 24 in two directions into unidirectional rotary motion that may be used to wind a mainspring 28. Reverser and gear trains 27 of this type are well known in the art of self-winding clocks and watches and may, for example, provide a ratchet and one or more interengaging spur gears. The gear train of the reverser and gear train 27 may provide a speed reduction between the weight 24 and the mainspring 28 providing mechanical advantage. The mainspring 28 may be a spiral wound spring of the type used in wristwatches, for example, having an outer peripheral end fixed with respect to the housing 11 and an inner end rotated by the reverser and gear train 27 about an axle 26' having an axis of rotation parallel to or coaxial with axle 26 for reduced mechanical linkage loss. The mainspring 28 may store the energy from the weight 24 through multiple excursions of the weight 24. A swinging of the weights 24 may generate on the order 100 micro joules and the mainspring 28 may provide storage of on the order of 500 micro joules so that the energy from multiple swings may be readily accumulated.

The mainspring 28 may also connect to an escape wheel 30 of the type found in watch movements, for example, by means of a common shaft 29 with the output of the reverser and gear train 27. Rotary motion of the escape wheel 30 under the force of the mainspring 28 is controlled by a pallet fork 32 which provides pallets 34 which interact with teeth 36 on the escape wheel to allow incremental rotation of the escape wheel 30 by one tooth for each reciprocating cycle of the pallet fork 32. The reciprocation of the pallet fork 32 in turn is controlled by means of a balance wheel 38 rotating about an axle 40. The balance wheel 38 is connected to a central helical timing spring 42 so that the balance wheel has a natural frequency of reciprocating rotation. This frequency of reciprocating rotation can be set to a predetermined frequency by adjustment of a stiffness of the central helical timing spring 42 at a known predefined frequency. This stiffness may be controlled, for example, by changing the helical length of the central helical timing spring 42, for example, by providing multiple clamp points 47 about its periphery which may be alternatively engaged as shown in FIG. 6 connecting the helical timing spring 42 at the clamp point 47 to the housing 11.

Figure 5:
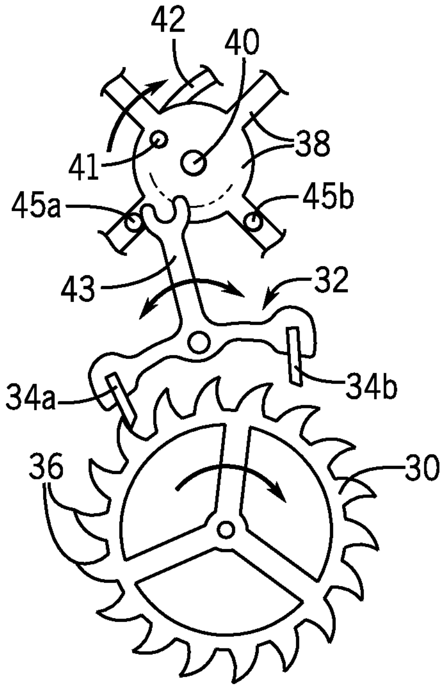
FIGS. 5 and 6 are detailed fragmentary views of the escapement and portions of the balance wheel showing impact between the escape wheel and the pallet forks in one half cycle.
Figure 6:
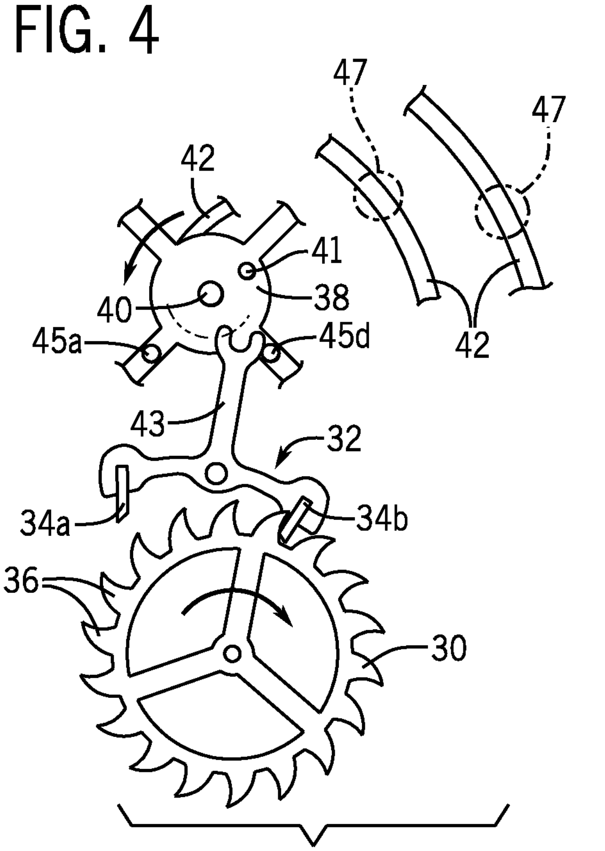

Referring now to FIGS. 5 and 6, when the balance wheel 38 has rotated fully in a clockwise position (as shown in FIG. 5), as arrested by the restoring force of the helical timing spring 42, a roller pin 41 eccentrically mounted on the balance wheel 38 will have previously engaged with a pallet fork 43 pushing it against banking pin 45*a* as shown so that pallet 34 is placed in the path of a tooth 36 of the escape wheel 30 causing that tooth to strike the pallet 34*a*. The escape wheel 30 thus is prevented from motion until, as shown in FIG. 6, the balance wheel 38 rotates fully in a counterclockwise direction so that the roller pin 41 pushes the pallet fork 43 fully rightward against banking pin 45*b* removing pallet 34*a* from interference with the tooth 36 while inserting pallet 34*b* in the path of a second tooth 36 which then strikes the pallet 34*b* again stopping the escape wheel 30. It will be appreciated that the striking between the teeth 36 of the escape wheel 30 and the particular pallets 34 comes after a brief period of acceleration of the escape wheel 30 under the force of the mainspring 28 thus providing a controlled energy in the form of an impulse impact to the pallets 34.

Repetitive motion of the balance wheel 38 in oscillation releases successive impulses of energy to the pallets 34 as the escape wheel 30 moves one tooth at a time synchronized to the harmonic motion of the balance wheel 38. In this way the balance wheel 38 may control a timing of energy produced by the pallets 34 as will be discussed below. In this embodiment, there will be two impacts and hence two energy impulses for each cycle of the balance wheel 38, the latter which thus can control a frequency of produced electrical pulses. Generally this time between tooth strikes may be adjusted between a range of once per second and 10 times per second or preferably between approximately 0.5 Hz to 50 Hz.

The above mechanisms of the eccentrically mounted weight 24, the reverser and gear train 27, the mainspring 28, the escape wheel 30 and pallet fork 32 as well as the balance wheel 38 and helical timing spring 42, with the exception of the pallets 34, may follow the teachings of a standard self-winding watch albeit scaled in size for the present therapeutic application as discussed herein.

Figure 4:
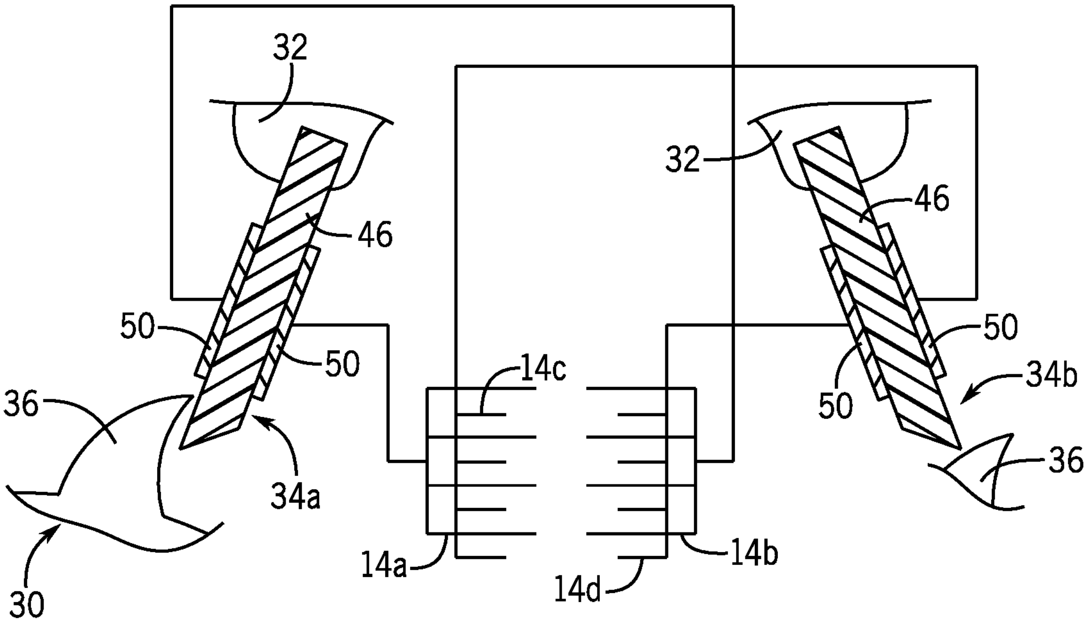
FIG. 4 is electrical schematic showing connection of piezoelectric pallet forks of the escapement to the electrodes of FIG. 1.

Referring now to FIG. 4, the pallet fork 32 is modified to replace the pallets 34 with electrically generating material such as a piezoelectric material 46 sandwiched between electrodes 50. The electrodes 50 are positioned so that when the pallet 34 (pallet 34*a* as depicted and as shown in FIG. 5) on one side of the pallet fork 32 strikes a tooth 36 flexure of the piezoelectric material 46, it produces an electrical voltage that may be communicated to electrodes 14, for example, with one electrode 50 of pallet 34 connected to electrode 14*a* and the other electrode 50 of the pallet 34 connected to electrode 14*b* positionable across a wound or at a site of therapeutic treatment. In this regard the pallets 34 may extend cantilevered from the pallet fork 32 to promote the desired flexure. Similarly, when the pallet 34*b* on the opposite side of the pallet fork 32 one half cycle later (as shown in FIG. 6) strikes a tooth (not shown in FIG. 4), its electrodes 50 may communicate with opposed electrodes 14*c* and 14*d*, the latter interleaved with electrodes 14*a* and 14*b* but separate there from to eliminate the need for steering rectifiers or electrical loading by one pallet 34 being struck by the remaining pallet 34. Alternatively, the electrodes 50 for the different pallets 34*a* and 34*b* may be connected in parallel to a single set of electrodes, for example, electrodes 14*a* and 14*b* eliminating electrodes 14*c* and 14*d*.

Figure 7:
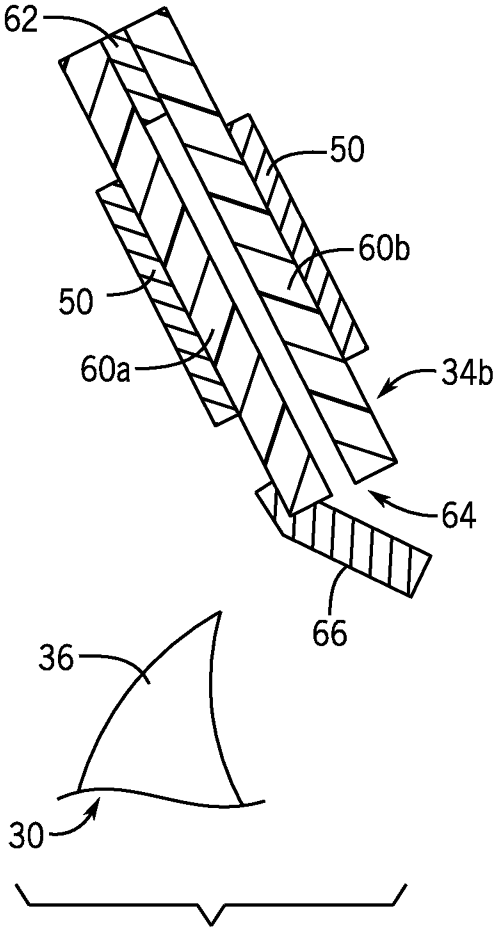
FIG. 7 is a fragmentary view of the pallet forks of FIG. 4 employing triboelectric generation.

Referring now to FIG. 7, in an alternative embodiment, the material of the pallets 34 (only pallet 34*b* shown for simplicity) may be triboelectric rather than piezoelectric. In this embodiment, two mutually triboelectric materials 60*a* and 60*b* may be spaced apart by a spacer 62 producing a gap 64 extending along a length of the pallet 34 such that when a tip portion 66 attached to a cantilever tip of one material 60*a* of pallet 34 strikes a tooth 36 of the escape wheel 30, the triboelectric materials 60*a* and 60*b* are pressed together only to be separated again when the tooth 36 passes the pallet 34. This contact and separation generates a triboelectric voltage communicated through flanking electrodes 50 as discussed above with respect to FIG. 4.

The invention contemplates other electrically generating mechanisms may be employed.

It will be appreciated by using the highly developed technology of a self-winding wristwatch, a dominant mode of mechanical motion of the body may be captured and efficiently converted to energy stored in a spring. This energy may be converted to pulses of electricity without the need for multiple stages of electrical conversion (for example, from AC to DC and then from DC to pulses) and without signal losses from the devices of a solid-state timing circuit which are eliminated by using a watch type mechanism to generate the desired regular pulses of electricity. This precise mechanism can produce extremely uniform amplitudes of pulses, for example, within a range of 0.1-20 V.

Figure 8:
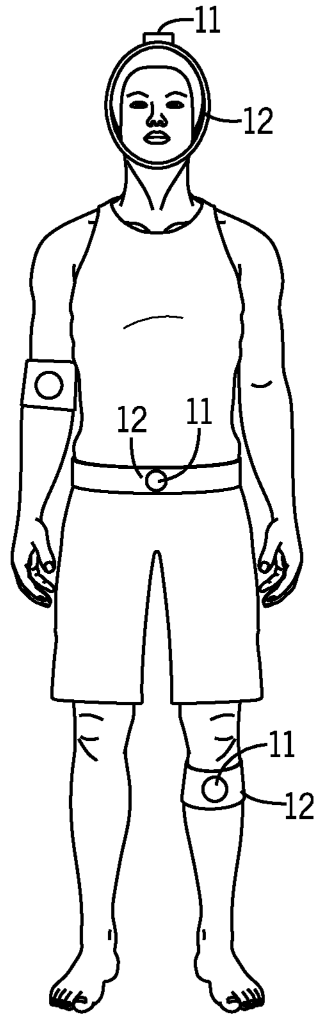
FIG. 8 is a simplified representation of a person showing various locations of the mechanical harvester suitable for wound healing or hair growth.
Figure 9:
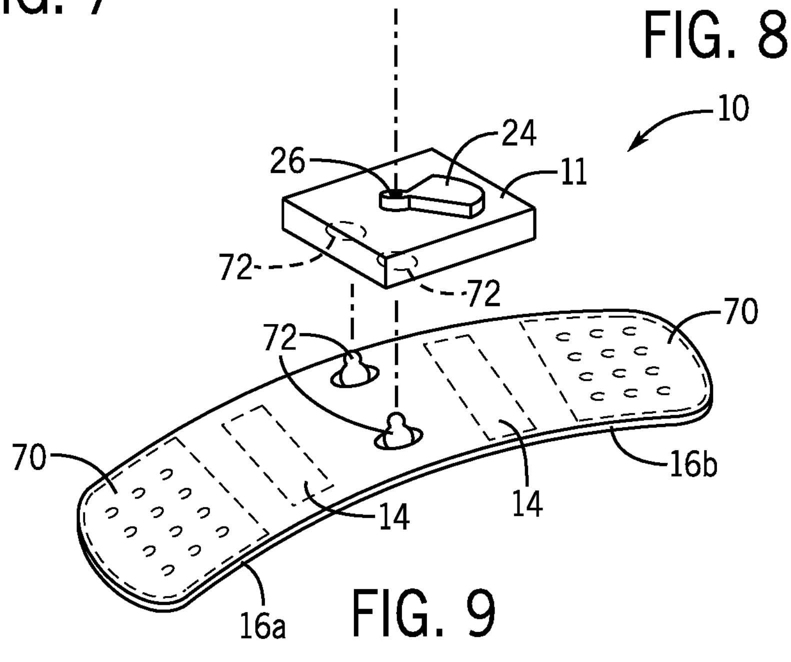
FIG. 9 is a figure similar to that of FIG. 1 showing an alternative embodiment with a replaceable adhesive bandage.

Referring now to FIG. 8, the band 12 of the present invention is adapted to hold the housing 11 at a variety of locations on the human body, for example, encircling an arm or leg or around person's abdomen or head for variety of different treatment areas. It will be appreciated that alternative methods of affixing the body movement energy harvester 10 to the body with positioning of electrodes may also be envisioned including adhesive patches or the like. Referring now to FIG. 9, in one embodiment, the straps 16*a* and 16*b* may be part of a disposable bandage having adhesive portions 70 to attach flexible and ventilated polymer straps 16 to the skin with electrodes 14 placed across a site of treatment. The housing 11 may be attached to the straps 16 by snap electrical connectors 72 so that it may be replaceably used with different disposable bandages in a cost-effective manner. A plane of rotation of the eccentric weight 24 may be generally parallel to a plane of the skin and the bandage for low profile. It will be appreciated that the mechanisms of the housing may be constructed of a polymer material for low cost and light weight other than the weight 24 which may include a metallic insert or other weight-increasing material.

In an alternative embodiment, the housing 11 may be attached to a hat (not shown) to harvest mechanical energy from random head motions. The electric pulses will be delivered to a pair of electrodes 14 placed inside the hat in contact with the user's skin to stimulate hair growth.

Certain terminology is used herein for purposes of reference only, and thus is not intended to be limiting. For example, terms such as "upper," "lower," "above," and "below," refer to directions in the drawings to which reference is made. Terms such as "front," "back," "rear," "bottom," and "side," describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second," and other such numerical terms referring to structures do not imply a sequence or order unless clearly indicated by the context. Although the stator and rotors are shown as disks in the disclosed embodiments, there is no requirement that the stator or rotor be in a disk form.

When introducing elements or features of the present disclosure and the exemplary embodiments, the articles "a," "an," "the," and "said," are intended to mean that there are one or more of such elements or features. The terms "comprising", "including," and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. A mechanical energy harvesting pulse generator comprising:

a housing adapted for support against a movable portion of a user's body;

a weight movably attached to the housing to move with respect to the housing with motion by the portion of the user's body;

an energy storage spring;

a winder mechanism communicating between the weight and the energy storage spring to wind the energy storage spring with movement of the weight with respect to the housing;

a mechanical oscillator communicating with the energy storage spring to provide reciprocating motion using energy of the energy storage spring; and an electrical generator moved by the mechanical oscillator to generate a regular train of electrical pulses;

wherein the mechanical oscillator is a balance wheel and escapement and wherein the electrical generator comprises at least one pallet of the escapement to flex with operation of the escapement.

2. The mechanical energy harvester of claim 1 wherein the electrical generator is at least one of a piezoelectric material and a triboelectric material flexed by movement of the mechanical oscillator.

3. The mechanical energy harvester of claim 2 wherein the mechanical oscillator provides an impulse force to the electrical generator by a striking between mechanical elements.

4. The mechanical energy harvester of claim 1 wherein the electrical generator produces at least one pulse with each cycle of rotation of the balance wheel.

5. The mechanical energy harvester of claim 4 wherein the energy generator provides two pallets of the escapement to flex with operation of the escapement and wherein the electrical energy generator produces two pulses with each cycle of rotation of the balance wheel.

6. The mechanical energy harvester of claim 1 further including electrodes adapted for applying the train of pulses to the skin of the portion of the user's body.

7. The mechanical energy harvester of claim 6 further including flexible attachment retainers for attaching the housing to the portion of the body with the electrodes adjacent to skin.

8. The mechanical energy harvester of claim 7 wherein the flexible attachment retainers include an adhesive for attaching the housing to a portion of the body through skin adhesion.

9. The mechanical energy harvester of claim 8 wherein the housing is releasably removable from the flexible attachment retainers.

10. The mechanical energy harvester of claim 1 wherein the weight is mounted to be stable at multiple angular positions about the pivot absent an inertial force on the weight.

11. The mechanical energy harvester of claim 10 wherein the weight has a maximum response to movement of the housing at frequencies less than 10 Hz.

12. The mechanical energy harvester of claim 1 wherein the electrical pulses have a voltage of at least 0.1 V.

13. The mechanical energy harvester of claim 1 wherein the weight is mounted on a pivot to rotate about an axis of the pivot with body motion.

14. The mechanical energy harvester of claim 13 wherein the energy storage spring is a helical coil spring windable about a spring axis parallel to the axis of the pivot of the weight.

15. A method of topical therapy employing a therapeutic device having a mechanical energy harvesting pulse generator providing a housing adapted for support against a movable portion of a user's body, a weight movably attached to the housing to move with respect to the housing with motion by the portion of the user's body, an energy storage spring, a winder mechanism communicating between the weight and the energy storage spring to wind the energy storage spring with movement of the weight with respect to the housing, a mechanical oscillator communicating with the energy storage spring to provide reciprocating motion using energy of the energy storage spring, and an electrical generator moved by the mechanical oscillator to generate a regular train of electrical pulses, the method comprising:

(a) attaching the mechanical energy harvesting pulse generator to a patient to be activated by normal body movement of the patient;

(b) providing electrical connection between the electrical generator and electrodes attached to the skin of the patient at a location to apply a regular train of therapeutic electrical pulses to the skin at the location; and wherein electrical pulses produced by the electrical generator are transmitted to the skin without conversion losses from rectifiers.

16. The method of topical therapy of claim 15 wherein the location is an area of a skin wound and the regular train of therapeutic electrical pulses are adapted to promote wound healing.

17. The method of topical therapy of claim 15 wherein the location is an area of desired hair growth and the regular train of therapeutic electrical pulses are adapted to promote hair growth.

* * * * *